United States Patent [19]

Griese et al.

[11] Patent Number: 4,645,055

[45] Date of Patent: Feb. 24, 1987

[54] REPLACEABLE LINER FOR A GRAIN ELEVATOR DISCHARGE SPOUT

[76] Inventors: Edward T. Griese, R.R.; Carl A. Griese, Jr., Box 524; Donald A. Griese, R.R., all of Dolliver, Iowa 50531

[21] Appl. No.: 848,803

[22] Filed: Apr. 7, 1986

[51] Int. Cl.⁴ .............................................. E04H 7/00
[52] U.S. Cl. ..................................... 193/2 R; 52/193; 52/195; 138/97; 138/36; 138/178; 193/25 R
[58] Field of Search ...................... 138/97, 98, 36, 104, 138/110, 178; 406/193; 222/527, 567; 193/2 R, 25 R

[56] References Cited

U.S. PATENT DOCUMENTS

| | | | |
|---|---|---|---|
| 2,478,326 | 8/1949 | Scarth | 406/193 |
| 2,578,003 | 12/1951 | Garbo | 406/193 |
| 2,966,373 | 12/1960 | Yount | 138/97 |
| 3,495,629 | 2/1970 | Botsolas | 138/97 |
| 4,054,194 | 10/1977 | Davis | 193/25 R |
| 4,109,684 | 8/1978 | Fernandez | 138/97 |
| 4,347,018 | 8/1982 | Wrightson | 138/97 |
| 4,554,721 | 11/1985 | Carty | 406/193 |

FOREIGN PATENT DOCUMENTS

| | | | |
|---|---|---|---|
| 201286 | 9/1908 | Fed. Rep. of Germany | 138/36 |
| 510324 | 10/1930 | Fed. Rep. of Germany | 138/36 |
| 2159055 | 6/1973 | Fed. Rep. of Germany | 193/2 R |
| 130403 | 11/1959 | U.S.S.R. | 406/193 |

Primary Examiner—Henry E. Raduazo
Attorney, Agent, or Firm—Herman H. Bains, Esq.

[57] ABSTRACT

The discharge spout of a grain elevator is provided with an abrasion resistant liner formed of polyurethane. The liner is formed into cylindrical configuration from a rectangular blade of material and may be readily inserted into the discharge spout and rotated relative thereto to permit even wearing of the liner. The abrasion resistant liner may be readily removed from the discharge spout and replaced with another liner to thereby eliminate any wear to the inner surface of the discharge spout.

2 Claims, 5 Drawing Figures

REPLACEABLE LINER FOR A GRAIN ELEVATOR DISCHARGE SPOUT

This invention relates to grain elevators and more particularly to an abrasive resistant liner for a grain elevator discharge spout.

BACKGROUND OF THE INVENTION

When grain, such as corn, wheat, barley, or the like, is discharged from an elevator, the grain is ultimately directed through an incline discharge spout into a receptacle, such as a grain car, truck body, or the like. Even though the discharge spouts are made of steel, grain is exteremely abrasive and quickly erodes the inner surface of the spout over which the grain moves. In a typical discharge spout, the grain flows along the lower incline surface of the spout and this lower surface is subjected to quick wear. The discharge spout cannot be rotated to permit even wearing of the inner surfaces and this condition requires the replacement of worn spouts. Because of the manner in which the discharge spout is attached to the delivery conduit, it is difficult to remove and replace. Attempts have been made to provide the discharge spout with abrasive resistance inserts, but the inserts are difficult to install and remove and cannot be manipultated within the discharge spout.

SUMMARY OF THE INVENTION

It is a general object of this invention to provide a novel and improved liner for a grain elevator discharge spout which eliminates wear and the need to replace the discharge spout.

Another object of this invention is to provide a novel liner for a grain elevator discharge spout in which the liner is formed of a high molecular weight polyurethane and is abrasive resistant and readily installed and removed with a minimum of effort.

These and other objects of the invention will be more fully defined in the following Specification.

FIGURES OF THE DRAWING

DESCRIPTION OF THE PREFERRED EMBODIMENT

Figure 1:
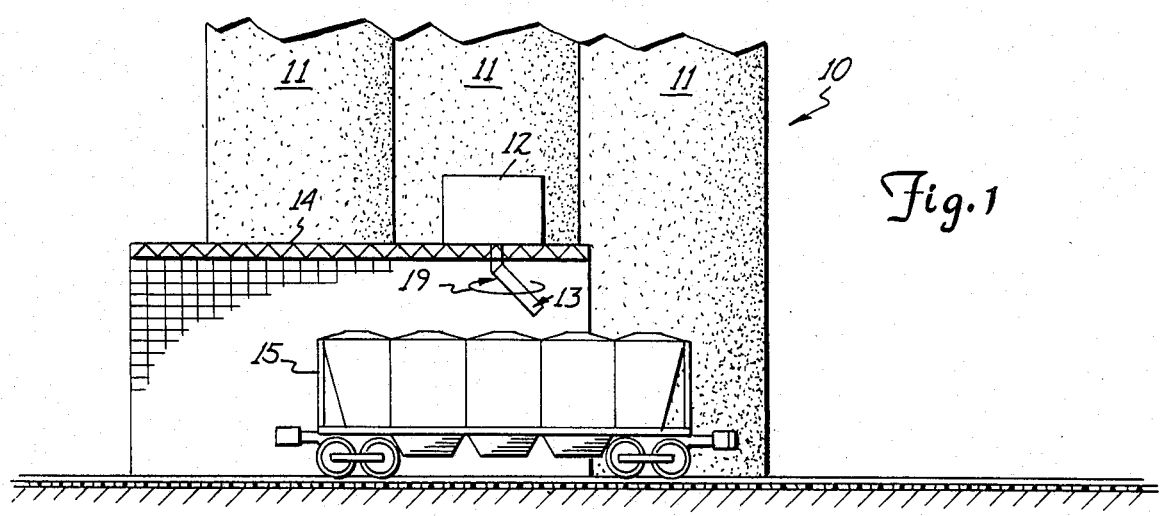
FIG. 1 is a side elevation of a grain elevator illustrating a conventional discharge spout.

Referring now to the drawings and more specifically to FIG. 1, it will be seen that a conventional grain elevator, designated generally by the reference numeral 10, is thereshown. The grain elevator may include a plurality of vertical storage towers or bins 11 which are adapted to contain and store grain, such as corn, wheat, barley, and the like. The grain is conveyed from the storage bin by suitable conveyor means (not shown) to a discharge hopper 12 which is provided with a discharge spout 13. The discharge hopper 12 is mounted on an overhead support structure to permit grain to be discharged therefrom into a conventional railway grain car 15 in a well-known manner.

Figure 2:
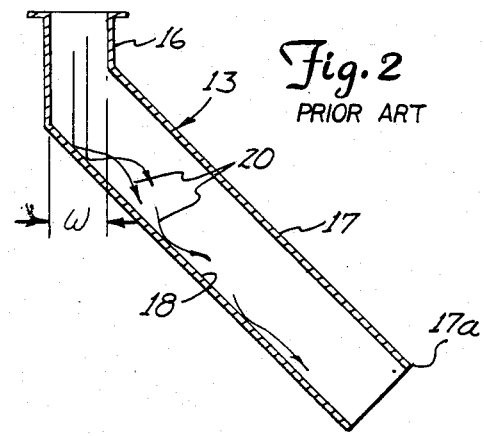
FIG. 2 is an enlarged cross-sectional view of a discharge spout.

Referring now to FIG. 2, it will be seen that a discharge spout 13, which is of conventional construction, includes a vertical portion 16 and an incline portion 17. The length of the discharge spout and, in particular, the length of the incline portion 17, will be dependent upon the particular mode of loading which is being used. Longer discharge spouts are used in loading holds of ships than those that are used in loading railway grain cars or truck bodies. At any rate, the grain will be discharged through the vertical portion and will move along the lower surface of the incline portion.

Referring now to FIG. 1, it will be seen that the directional arrow 19 illustrates that the discharge spout 13 may be rotated about a vertical axis, but the same lower inner surface portion will be presented for movement of the grain thereover. The directional arrows 20 and 22 illustrate the manner in which the grain is moved over the inner surface 18 of the discharge spout. It is this lower surface portion which is subjected to the severest wear before the grain is discharged from the end 17a of the spout. In conventional discharge spouts, during heavy unloading of the storage bins, the spouts will wear very quickly and must be replaced. Replacement of the spout is very difficult and is a timeconsuming operation.

Figure 3:
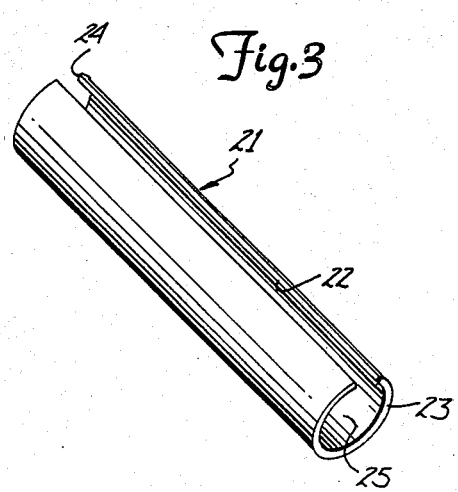
FIG. 3 is a perspective view of the novel abrasive resistant liner.

Referring now to FIG. 3, it will be seen that one embodiment of the novel liner 21 is thereshown. The liner is formed of high molecular weight polyurethane and is extremely abrasive resistant. The polyurethane plastic is formed in general in a polymerization reaction of di-isocyanates with polyols. The liner 21 is a rigid construction and the rectangular blanks of material which are used to form each liner are heated in an oven and shaped into a cylinder, as illustrated in FIG. 3. Each liner includes longitudinal edges 22 which are disposed in substantial abutting relation at the completion of the shaping or molding step. Each liner also includes a front end edge 23 and a rear edge 24. When each liner is inserted into the incline portion 17 of each discharge spout 13, the liner will extend throughout the length of the discharge portion.

Figure 4:
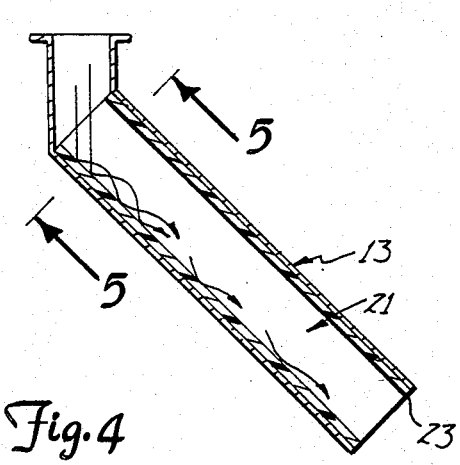
FIG. 4 is a cross-sectional view of a discharge spout, similar to FIG. 2, but illustrating the insert in installed relation therein.

Referring now to FIG. 4, it will be seen that the liner 21 extends from the end of the vertical portion 16 of the discharge spout to the discharge end of the incline portion 17. It will also be noted that the direction and manner which the grain is directed through the discharge spout 13 is illustrated by the directional arrows. In this regard, it will be noted that the grain strikes the upper portion of the inner surface 25 of the liner 21 as it is directed through the vertical portion 16 and then bounces or rolls along the inner surface and is discharged from the discharge end 17a of the incline portion.

Figure 5:
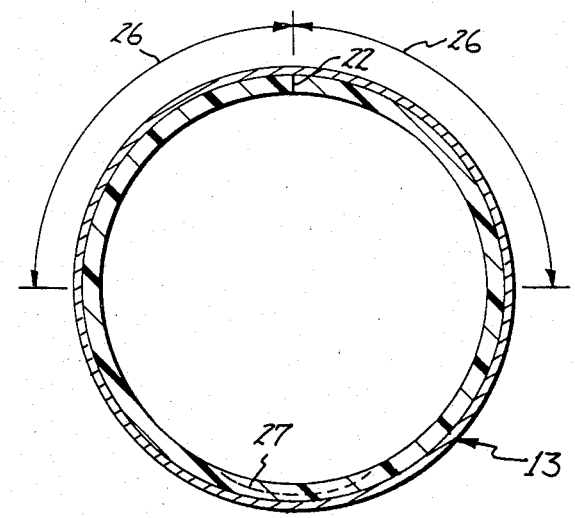
FIG. 5 is a cross-sectional view taken approximately along line 5—5 of FIG. 4 and looking in the direction of the arrows.

Even though the liner 21 is abrasion resistant, the liner is still subject to wear, as illustrated by the dotted line worn surface portion 27 in FIG. 5. It will be appreciated that the worn surface area 27 occurs along that portion of the liner that is oriented to receive the abrasive action of the grain, as illustrated in FIG. 4. When a worn surface area develops, the operator may rotate the liner, as indicated in FIG. 5. In this regard, the liner may be readily rotated by an operator to reposition the liner without removal of the liner from the spout. However, it is pointed out that the abutting edge surfaces 22 should not be positioned so that the abutting seam is positioned in the zone of extreme wear. Therefore, it is preferred that the abutting surface seam be rotated in either direction, as indicated by the directional arrow 26, so that the seam is positioned in a generally lateral location relative to the zone of wear.

By simply rotating the liner, an operator may obtain an extended period of use from each liner before there is any need to discard the liner. Once the liner becomes worn along a substantial portion of its inner surface, a liner may then be readily removed from the discharge spout and a new liner may then be readily inserted into the discharge spout. With this arrangement, the discharge spout 17 requires little, if any, maintenance or replacement. Thus, the down time attributed to maintenance and/or replacement of the discharge spout is obviated, which is extremely important during periods in which large amounts of grain are being unloaded from the elevators.

The liners may be replaced for only a fraction of the cost involved in replacing a discharge spout. It will be appreciated that the down time in replacing a discharge spout involves non-productive time during an important unloading phase of the elevator.

Thus, it will be seen that we have provided a novel liner device for a grain elevator discharge spout which is not only of simple and inexpensive construction, but one which functions in a more efficient manner than any heretofore known comparable device.

What is claimed is:

1. In combination with an elongated discharge spout for a grain elevator, said discharge spout being formed of metal and being oriented in an inclined relation to direct grain therethrough, an abrasion resistant elongated liner formed of high molecular weight polyurethane positioned in said spout in snug fitting relation therewith, said liner being formed from a rectangular blank of high molecular weight polyurethane material and being shaped into cylindrical configuration with the longitudinal edges thereof disposed in confronting abutting relation, said liner being rotatable in the discharge spout to permit even wearing of the inner surface of the liner, and said liner being readily removable from the spout to permit replacement thereof when the liner has become worn.

2. The invention as defined in claim 1 wherein said liner corresponds in length to length of the incline discharge spout.

* * * * *